United States Patent
Nunuparov (10) Patent No.: US 6,684,994 B1
(45) Date of Patent: Feb. 3, 2004

(54) ELECTROSTATIC DEVICES FOR MECHANICAL BLOCKING

(76) Inventor: Martyn Sergeevich Nunuparov, Russia, 103460, Moscow, Zelenograd, korp.1133. kv.159 (RU)

( * ) Notice: Subject to any disclaimer, the term of this patent is extended or adjusted under 35 U.S.C. 154(b) by 0 days.

(21) Appl. No.: 09/958,861

(22) PCT Filed: Apr. 12, 2000

(86) PCT No.: PCT/RU00/00127
§ 371 (c)(1),
(2), (4) Date: Oct. 12, 2001

(87) PCT Pub. No.: WO00/62411
PCT Pub. Date: Oct. 19, 2000

(30) Foreign Application Priority Data

Apr. 14, 1999 (RU) ............................................ 99107534

(51) Int. Cl.[7] ............................. H02N 13/00; G05G 6/02
(52) U.S. Cl. ...................... 192/84.4; 192/20; 192/21.5; 251/129.01 A; 475/149
(58) Field of Search ................... 192/84.1, 84.4, 192/20, 41 R, 47, 30 R, 21.5; 251/129.01; 475/149; 74/25

(56) References Cited

U.S. PATENT DOCUMENTS

| | | | | |
|---|---|---|---|---|
| 3,240,306 A | * | 3/1966 | Armstrong | 192/84.4 |
| 3,871,944 A | * | 3/1975 | Dominguez-Burguette | 192/84.4 X |
| 4,747,476 A | | 5/1988 | East et al. | 192/107 M |
| 4,777,193 A | | 10/1988 | Kani | 523/153 |
| 4,782,927 A | * | 11/1988 | Sproston et al. | 192/21.5 |
| 4,912,460 A | | 3/1990 | Chu | 340/825.31 |
| 5,249,657 A | * | 10/1993 | Miyoshi | 192/20 |
| 5,508,327 A | | 4/1996 | Cipriano et al. | 523/427 |
| 5,525,642 A | * | 6/1996 | Cipriano et al. | 192/84.4 X |
| 5,620,071 A | * | 4/1997 | Ishikawa et al. | 192/21.5 |
| 5,677,824 A | | 10/1997 | Harashima et al. | 361/234 |

FOREIGN PATENT DOCUMENTS

| | | |
|---|---|---|
| EP | 0 028 707 A1 * | 5/1981 |
| EP | 0 540 315 A2 | 5/1993 |
| RU | 94036400 | 7/1996 |

OTHER PUBLICATIONS

International Search Report pertaining to PCT/RU 00/00127 completed on Jul. 18, 2000.

* cited by examiner

Primary Examiner—Rodney H. Bonck
(74) Attorney, Agent, or Firm—Jenkens & Gilchrist, P.C.

(57) ABSTRACT

An electrostatic unit for location of members of mechanical devices includes a housing of the electrostatic location unit, a locating member arranged in the housing and movable from one position to another, an electrostatic location apparatus for location of the locating member in one of the positions, placed in the housing and including two electrically conductive members and a layer of a dielectric therebetween, conformal surfaces of the electrically conductive members and the dielectric for electrostatic interaction and location of one relative to the other when they are in close proximity to each other and an electric charge is applied to the electrically conductive members. At least one of the members of the electrostatic location apparatus includes a layer of an elastic material on a conformal surface.

26 Claims, 4 Drawing Sheets

ELECTROSTATIC DEVICES FOR MECHANICAL BLOCKING

FIELD OF THE INVENTION

The present invention relates to the art of interlocks, more particularly to electrostatic mechanical interlocks. The invention can be used in transmissions for development of valve-actuating mechanisms of gas/hydraulic distribution systems that make it possible to control the operation of said mechanisms and transmissions by low-power electrical signals.

The invention can be also used for development of electronic locks, electrical clutches and other transmission mechanisms, electronically controlled valve-actuating mechanisms and other interlocks characterized by very low energy consumption.

BACKGROUND OF THE INVENTION

Known in the art is an electrostatic interlock (cf., U.S. Pat. No. 4,912,460), which uses the effect of electrostatic interaction of individual members in order to move them and set in different positions.

In the prior art interlock, the magnitude of electrostatic attraction forces between members of the electrostatic interlock essentially depends upon features of machining the surfaces of interacting members and upon a distance therebetween.

It is common knowledge that the electrostatic forces increase with an increase in the effective contact area of interacting surfaces, with a decrease in the effective distance therebetween, and with the growth of the dielectric permittivity of the spacing therebetween.

These conditions restrict the use of the prior art device, because the forces of electrostatic attraction of said interlock members spaced originally at a certain distance from one another will be very small to permit reliable control of their mutual approach. Besides, direct use of electrostatic forces for bringing together the electrostatic interlock members is uneconomical from the viewpoint of energy saving.

In another prior art device (RU Patent No. 2,042,028), electrostatic interaction of members is more effective, because the members are in close proximity to one another, and their mutual positions are retained by friction forces increasing indirectly under conditions of electrostatic interaction. Hence, the electrostatic forces not make any mechanical work and, therefore, not consume any additional energy from an electric energy source.

As indicated, however, the electrostatic interaction force used in both prior art devices depends upon roughness of surfaces, presence of foreign particles therebetween, and upon irregularity of the gap therebetween.

High requirements developed therewith to a degree of polishing of member surfaces, their mutual flatness or, generally, mutual conformity of interacting surfaces, and the requirements to a purity of member assembling make such the devices expensive, reduce operation reliability and service life, and limit applicability as well.

SUMMARY OF THE INVENTION

It is an object of the present invention to provide an electrostatic mechanical interlock and a method of manufacturing thereof that would be capable to provide inexpensive manufacture of the design of an electrostatic unit for location of members of electromechanical devices, and would be capable to provide reliable location of electrostatically interacting members.

The above object is accomplished in that, in an electrostatic unit for location of members of a mechanical device, which electrostatic unit comprises a locating member arranged in an electrostatic location unit housing that is movable from one position to another, an electrostatic location means designed for location of the locating member in one of the positions and being placed in the housing and comprising two electrically conductive members and a layer of a dielectric therebetween, conformal surfaces of the electrically conductive members being designed for electrostatic interaction and mutual location of one relative to the other when they are set in close proximity to each other and when an electric charge is applied to the electrically conductive members, one of said members of the electrostatic location means being kinematically linked to the locating member, a means for applying an electric charge to the electrically conductive members, said means being connected to the electrically conductive members, according to the invention, at least one member of the electrostatic location means comprises a layer of an elastic material on a conformal surface, and the elastic material is selected from the group consisting of an electrically conductive material and a dielectric material.

One of the principal advantages of using the elastic material is associated with that, in contacting the conformal surfaces of the electrically conductive members positioned in close proximity to one another, the elastic material clings irregularities of interacting surfaces associated with their roughness, point defects and, in particular, compensates for loose pressing the non-flat surfaces to each other. With this, the effective contact area of conformal surfaces increases, and their electrostatic interaction force increases respectively.

This advantage makes it possible to reduce operating electrical voltages necessary for reliable operation of the electrostatic location unit.

Another important advantage of using the elastic material reveals itself if said material is used in electrostatic units operating under conditions of elevated vibration when the effective distance between conformal surfaces is subjected to rapid change with a resultant weakening or even a momentary loss of electrostatic interaction of members. The use of the elastic material in the gap between the members also effectively compensates for such temporary variations in the size of the gap.

Yet another advantage of using the elastic material is that it allows for a coarser closing and setting of conformal surfaces into close proximity to one another, which sufficiently simplifies the process of manufacturing the interacting members and means for their setting.

Elastic materials required for accomplishment of the object of the invention may be dielectric or electrically conductive materials. In case if an elastic material is electrically conductive, it is advisable to arrange a non-elastic dielectric separating the conformal surfaces on the mating hard surface. Should a dielectric elastic material was selected, it is important that its thickness is sufficiently small and its dielectric permittivity is sufficiently high to provide effective electrostatic interaction of electrically conductive members separated thereby.

An elastic material may also be in a form of a multi-layered material comprising electrically conductive and dielectric sublayers. Such a form is suitable in those cases when the elasticity of a layer is provided by one of the sublayers, for instance, by a dielectric sublayer, while a second sublayer is made to be sufficiently thin and performs electrical conductance functions of the material or, conversely, an elastic layer is electrically conductive while the other thin sublayer performs dielectric functions.

Electrically conductive sublayers in an elastic material may be provided in different ways, for instance, by depositing a sublayer of a metal onto a sublayer of a dielectric material, introducing particles of an electrically conductive material into a surface region of the dielectric sublayer by diffusion or implantation, and also by chemical or stoichiometric methods for changing a composition of the surface region of the dielectric sublayer a result of which is electrical conductance.

Similar methods can be used to develop dielectric sublayers coating an electrically conductive sublayer, for instance, by depositing a dielectric sublayer, oxidizing a surface of the electrically conductive sublayer, and also by other chemical or electrochemical modifying the surface of the electrically conductive sublayer as a result of which the surface becomes dielectric.

Very moderate in price and the most easy in use is an elastic material produced as a thin elastic film secured on a carcass.

The film can also be produced as a multi-layered structure comprising electrically conductive and dielectric sublayers. The most preferable embodiment of an elastic film having a conducting sublayer is an elastic dielectric polymeric film having a thin layer of a metal deposited onto one or both surfaces.

The film may be attached to a respective member of the electrostatic location means by both fastening the carcass on said member and by direct attaching determined portions of the film to determined portions of the member.

In doing so, embodiments are allowable wherein a film is attached to a member of an electrostatic location means while a carcass has no link to said member and is held in the structure owing to film tension, as a result of which a freedom degree is added in the process of adapting a film surface of the member of the electrostatic location means to a conformal surface of another member.

An additional advantage of using thin elastic films consists in that different, generally three-dimensional topological forms can be given to a film surface by varying a form of a carcass. Thus, the carcass can have a contour in the form of a flat circle, a rectangle, or a complex three-dimensional contour.

In some cases, a carcass can be made of an elastic material and change its form under mechanical action thereto.

For securing of a film on a member of the unit and/or on a carcass one can use different processes, such as gluing, welding or clamping like a film in a tambour.

When it is necessary to isolate electrically conductive members and mechanical members of a unit galvanically, it is advisable to apply an electric charge directly to the electrically conductive sublayer of the film, for which purpose a means for applying an electric charge should be connected directly to the electrically conductive layer or sublayer of the film.

Many designs require to manufacture a multi-member carcass for the film, e.g. a carcass comprising multiply linked members.

For instance, a carcass consisting of two non-linked rings, a diameter of one ring being more than that of the other while the rings being arranged in one plane and one inside the other, allows to fasten the film as a flat ring. Such a carcass is necessary in devices where a mechanical axle should be placed to pass through an inner ring of the carcass. In doing so, it is permissible to fasten only one of the carcass rings on members of an electrostatic location means. Free position of the second ring provides optimum adaptation of conformal surfaces of interacting members to each other.

A carcass comprising two rings that have equal diameters, are placed in different parallel planes and have centers on the same axis, makes it possible to give a cylinder form to the elastic film. An embodiment of such a conformal surface of a member of an electrostatic location means permits to manufacture electrostatic location units of a small overall dimension in one direction for different compact electromechanical devices.

A carcass comprising a ring and a disc which have different diameters, are placed in different parallel planes and have centers on one axis, makes it possible to fasted the film as a cone. This design is preferable in case of small overall dimensions when it is necessary to move apart conformal surfaces to a certain distance from one another.

In a general case, the film may be fastened such that a part of a film contour may be free and have no fastening on the carcass. For instance, such an embodiment of an electrostatic location means is tolerable when a film of a rectangular contour form is fastened on a rigid carcass only along one or two sides. Then, additional freedom degrees occur for final forming a film surface, the additional freedom degrees allowing said surface to adapt to a form of its mating second electrically conductive member of an electrostatic location means, which member can have the form of a cylinder or the form of a thin bar, etc.

Since the distribution of the electric charge over the surface of the electrically conductive member is but little effected by the resistance of its layers, the elastic material can be selected from the group of electrically conductive polymeric materials whose conductance is not high in comparison with metals, but whose elastic properties of polymers are strongly pronounced.

When selecting a polymeric base for elastic materials, both bulk-high and film-thin, for their layers and sublayers as well as for coatings on non-elastic surfaces of electrostatically interacting members of an electrostatic location means, it is advisable to turn to materials having high mechanical wear resistance, high dielectric constant, climatic and temperature stability and longevity.

The above qualities are typical for materials based on or containing polyethylene terephtalate, polytetrafluoroethylene, polytrifluorochloro-ethylene, polyimide as well as different kinds of rubbers, in particular, silicon rubber.

A promising pair of materials for members of an electrostatic location means is a pair of an elastic conductive polymer on one member and a semiconductor material on another member. Besides all the aforesaid advantages of using an elastic material, this pair will display the effect of Ionson-Rabek.

The design of the electrostatic location unit allows different variants of setting, mutual movement and final positions for conformal surfaces of unit members.

Conformal surfaces may be arranged in close proximity to one another, particularly, may be in complete or partial contact.

At the same time, mutual movement can take place along a conformal surface. Conformal surfaces can reciprocate and perform rotary motions, and when an electric charge is applied to electrically conductive members, the location of mutual position will take place owing to an indirect increase of friction forces.

In another embodiment of the electrostatic location unit, conformal surfaces of electrically conductive members may have two extreme positions: in close proximity to one another and at a certain distance from one another; hence, said members can move both along a conformal surface and along a normal thereto.

In a position when surfaces of said members are spaced, their possible electrostatic interaction weakens considerably, therefore, mutual location of position of members is possible only if they are set in close proximity. Such a setting may be achieved by exerting a certain influence to the locating member kinematically linked to one of said members.

In most designs, mutual position of electrically conductive members has one initial position, and there is a need for additional setting a means for returning electrically conductive members to this position after they have completed their mutual movements. Such a means may be directly linked to electrostatically interacting members or, as a possible alternative, link the locating member and the housing of the electrostatic location unit.

A wide way to introduce electrostatic location units is their use as electromechanical gate control mechanisms for gas/hydraulic distribution systems.

Assigned to such units is an electrostatic location unit made as an electromechanical valve, said unit further comprising a pipe with a valve seat and a gate for a hole of this seat, which gate is capable to take two positions: in one position, the hole of the seat is closed, and in the other position, the hole of the seat is open; wherein the housing of the electrostatic location unit is mounted on the pipe whereas the locating member is kinematically linked to the gate.

Use of electrostatic interaction in electromechanics continuously attracts design engineers' attention. In one prior art device, engagement of two independent shafts is achieved with the help of an electrostatically controlled force of friction between engaging members of a clutch.

Despite the fact that said invention offers a method for enhancing electrostatic interaction by using a polymeric semiconductor material in a gap between members, said material exhibiting the Ionson-Rabek effect, the device also suffers from the aforementioned disadvantages of electrostatic units arising from high requirements to the purity of machining the interacting member surfaces and to the fine adjusting of the gap therebetween.

Said clutch cannot be effectively used in mechanisms subjected to large and well-monitored shaft engagement forces, since the range of electrostatic control of the friction force between interacting members is relatively small.

Known in the art are also electrostatic interlocks that use electro-rheologic liquids changing viscosity under influence of an electrostatic field, however, such devices are also deficient in that the mechanical force for location of electrostatically interacting members of a unit and a locating member linked to one of said members is small.

There is a reason to think, therefore, that electrostatic location units generally cannot serve as reliable power members of electromechanical devices, since both electrostatic forces as such and indirect forces accompanying the electrostatic interaction of members of said units are too small to provide reliable counteraction against forces exceeding one kilogram.

Hence, an electrostatic location unit can be most effectively used only as a monitoring member of a power electromechanical device kinematically interacting with power interlock means and allowing to prepare the change of a device status from locked to unlocked, or vice versa, by applying a low-power electric signal to such a device.

It is an another object of the present invention to provide an electromechanical device for power engagement of mechanism members designed for engagement which, owing to the presence of a power engagement means and an electrostatic unit for location of said means, enables power interaction of engagement members when a low-power electric signal is applied to the electrostatic location unit.

Said technical result is accomplished in that an electromechanical device for power engagement of mechanism members, comprising an electrostatic location unit including a unit housing and a locating member linked to the housing and arranged so that it is capable of moving from one position to another, and also a means for applying an electric charge to the electrostatic location unit, said electromechanical device further comprising at least two engaging members linked by mechanism members and designed for power engagement relative to one another, a means for power engagement of the engaging members, said power engagement means being kinematically linked to at least one of the engaging members and having locked and unlocked positions, a means for returning the power engagement means to the initial position, said returning means being linked to one of the engaging members, wherein the power engagement means is kinematically linked to the locating member of the electrostatic location means, while the means for returning the power engagement means is linked to at least one of members selected from the group consisting of the power engagement means and the locating member.

It should be noted that the internal arrangement of the electrostatic location unit in this electromechanical device may have different modifications, wherein a gap between electrically conductive members of the electrostatic location unit may contain an elastic material fastened by at least one of said members, or may contain an electro-rheologic liquid. In both the embodiments, the requirements to surface finish purity and accuracy of mutual setting the electrically conductive members are moderate.

The electromechanical device for power engagement described above can be realized in various embodiments to interlocks and transmissions.

For instance, the electromechanical device for power engagement can be realized as a planetary gear clutch designed to transfer rotary motion from one shaft to another, whose axes being coincident, said planetary gear clutch comprising a ring gear secured on one shaft having a slot and limiters made on a toothed surface of said gear, a sun wheel secured on the other shaft and arranged inside the ring gear. The clutch also comprises a means for power engagement of the sun wheel and the ring gear, said means being made as a satellite gear and having positions: in one position, the satellite is in the slot of the ring gear so that the ring gear and the sun wheel are out of power engagement; and in the other position, the satellite gear thrusts against a limiter so that the ring gear and the sun wheel are in power engagement. At the same time, the housing of the electrostatic location unit is secured on the same shaft as the sun wheel, while the locating member is made as a satellite gear carrier and locates the angular position of the satellite gear relative to the angular position of the sun wheel when the electric charge is applied to the electrostatic location unit. The clutch also comprises a means for returning the satellite gear into the slot of the ring gear, said returning means being made as a spring linked to the carrier and the ring gear of the clutch.

Such a clutch may transfer a considerable torque from one shaft to another when a low-power electric signal is applied to the electrostatic unit for location of the carrier.

Another, simpler in manufacture, embodiment of the power electromechanical clutch can be made as an overrunning clutch that comprises a bushing secured on one shaft, a cam secured on the other shaft, arranged inside the bushing and made as a disc having a slot arranged on the disc perimeter, a means for power engagement of the cam and the bushing, said power engagement means being made as a friction disc arranged in a space between the cam and the bushing and having an axis parallel to an axis to the shafts, a diameter of the disc slightly exceeding the difference between an inner diameter of the bushing and an outer diameter of the cam so that the friction disc does not come into contact with the bushing when fitting into the cam slot and, when going out from the cam slot, causes power friction jamming of relative motion of the cam and the bushing, an electrostatic location unit designed for location of the angular position of the friction disc relative to the angular position of the bushing, said unit being secured on a bushing shaft and comprising a locating member made as a flat fork rotating on an axle coincident with the axis of the shafts and having a slit that is a guide for the friction disc when it reciprocates radially from the cam to the bushing. At the same time, the means for returning the friction disc to the initial position in the cam slot is made as a spring linked to the friction disc and the cam axle.

It is evident that, in a number of designs, planetary gear or overrunning clutches can comprise more complicated engagement means, in particular, cassettes having more than one satellite gear or friction disc.

In the clutch embodiments described above, the power engagement means moves from one position to the other as a result of its kinematic interaction with engaging members. A power engagement device in a number of designs can further comprise a means for mechanical setting the power engagement means to a selected position, said mechanical setting means being linked to one of engaging members and being necessary for forced displacement of the power engagement means.

Specifically, the invention offers an embodiment of a device designed for interlocking the transfer of motion from a driving member to a driven member of a transmission mechanism in which the driving member is made as a disc rotating about an axle secured in the transmission mechanism and comprising a slot arranged on the disc perimeter, the driven member being made as a bar reciprocating in a cradle secured in said mechanism, a means for power engagement of the driving and driving members being made as a dog rotatably secured on an axle which is fastened on the driving member. At the same time, the housing of the electrostatic location unit is arranged on the disc of the driving member, while the locating member is made as a disc whose axle is coincident with the axle of the driving member rotating about said axle and comprising a slot arranged on the disc perimeter. In this device, the means for mechanical setting the dog to the position of engaging the slots in the discs is made as a spring linked to the bar and the dog, while the means for returning the dog to the initial position is made as a spring linked to the disc, the locating member and the housing member of the transmission mechanism.

The disclosed device can be very effective to develop various systems of electronic locks.

BRIEF DESCRIPTION OF THE DRAWINGS

The invention will now be explained in detail by description of preferred embodiments thereof with reference to the accompanying drawings, in which.

DESCRIPTION OF PREFERRED
EMBODIMENTS OF THE INVENTION

Figure 1:
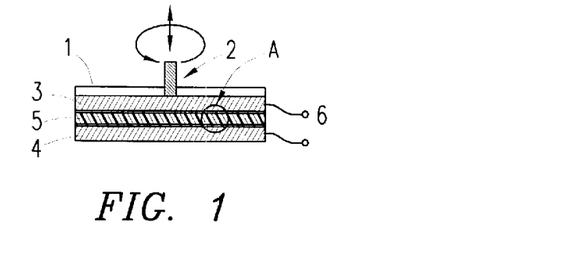
FIG. 1 is a general view of the electrostatic location unit according to the invention.

An electrostatic location unit comprises a housing 1 (FIG. 1), a locating member 2 placed in the housing and partly extending beyond it, electrically conductive members 3 and 4 separated by a dielectric 5 and also placed in the housing, one electrically conductive member 3 being linked to the locating member 2.

Figure 2A:
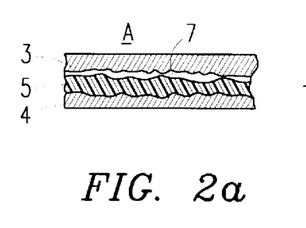
FIGS. 2a, b show a real rough structure of conformal surfaces of electrically conductive members in close proximity to one another according to the invention.
Figure 3A:
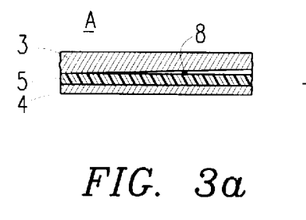
FIGS. 3a, b show the influence of defects on loose fit of surfaces according to the invention.

A real surface of the electrically conductive member has irregularities 6 (FIG. 2a) which increase the effective distance between conformal surfaces. Hard inclusions 8 entered a gap between the surfaces produce a similar negative effect (FIG. 3a).

If the surface of at least one of the electrically conductive members contains an elastic material 9 (FIGS. 2b, 3b), this material compensates for loose bearing between the surfaces, associated with said irregularities of hard surfaces and assembly defects of the location unit.

Figure 2B:
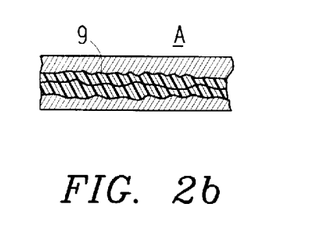
Figure 3B:
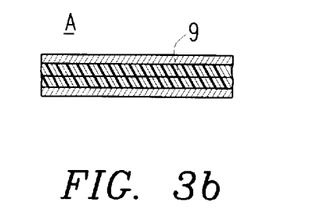

With this, electrical charges of opposite equipotential surfaces are positioned closer to one another, thereby increasing their electrostatic interacting force.

Figure 4A:
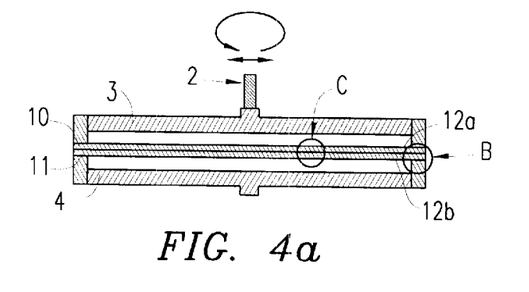
FIG. 4a represents an embodiment of electrically conductive members of the electrostatic location means having an elastic film secured on a carcass according to the invention.

As noted above, the most-adaptable-to-stream-lined-production embodiment of the electrically conductive members with an elastic material on a conformal surface is an embodiment wherein an elastic film secured on a carcass is selected as the elastic material. FIG. 4a illustrates an embodiment of the electrically conductive members 3 and 4, carcasses 10 and 11 being fastened to each electrically conductive member, respectively, with films 12a and 12b secured thereto and forming elastic conformal surfaces for the member 3 and the member 4, respectively.

Figure 4B:
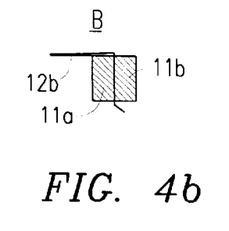
FIG. 4b represents an embodiment of fastening a piece of film between two circles of a circular frame, like in a tambour, according to the invention.
Figure 4C:
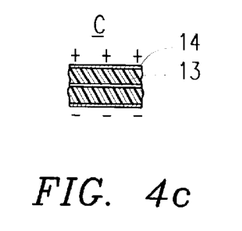
FIG. 4c represents a preferable structure of an elastic film according to the invention.

FIG. 4b shows a method of fastening the film by clamping it in a tambour that can be formed of two carcass members 11a and 11b whose contours are of the same form and size for mechanical mating.

FIG. 5 illustrates different embodiments of carcasses for films, that allow to form conformal surfaces of different shapes.

Figure 5A:
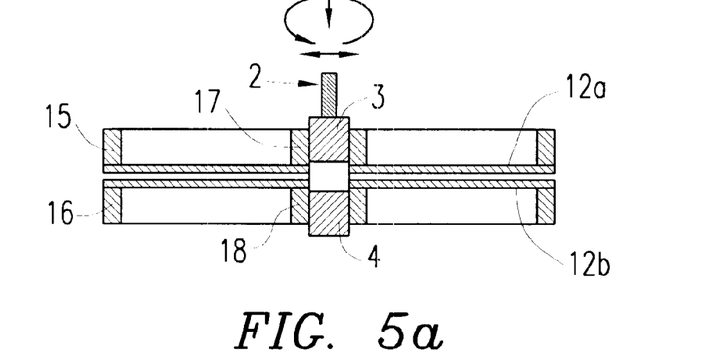
FIG. 5a represents an embodiment of fastening a piece of film in the form of a flat ring according to the invention.

FIG. 5a illustrates the design of carcasses 15, 17 for the electrically conductive member 3 and carcasses 16, 18 for the electrically conductive member 4, said carcasses being made as flat rings arranged by pairs in the conformal planes of respective electrically conductive members having one axle.

Films secured on such carcasses have a plurality of freedom degrees, and their surfaces easy adhere to one another under the conditions of electrostatic interaction.

Figure 5B:
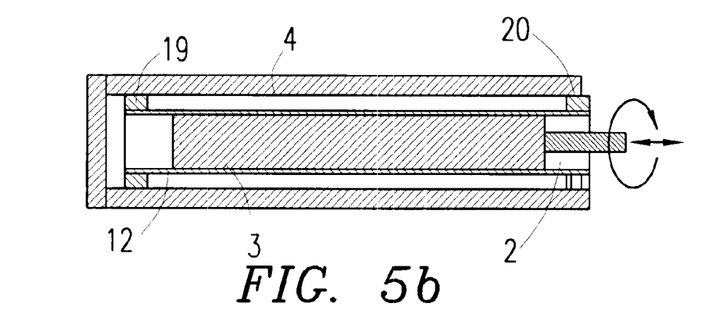
FIG. 5b represents an embodiment of fastening a piece of film in the form of a cylinder according to the invention.

In FIG. 5b, a film 12 is made as a cylinder owing to coaxial arrangement of carcass rings 19 and 20, but in different planes. Such a design allows to develop electrostatic location units in which the electrically conductive members 3 and 4 have a small overall dimension in one cross-section.

Figure 5C:
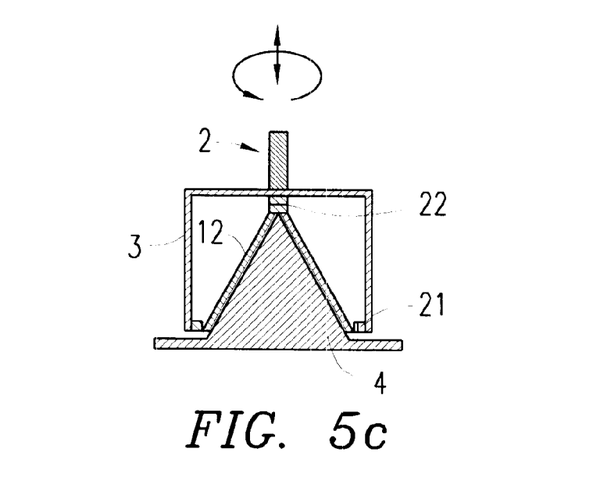
FIG. 5c represents an embodiment of fastening a piece of film in the form of a cone according to the invention.

FIG. 5c illustrates an embodiment wherein the film 12 is secured on the carcass having a disc member 22 and a ring member 21 arranged in different planes and having different diameters. The film in this embodiment takes the form of a cone.

Figure 5D:
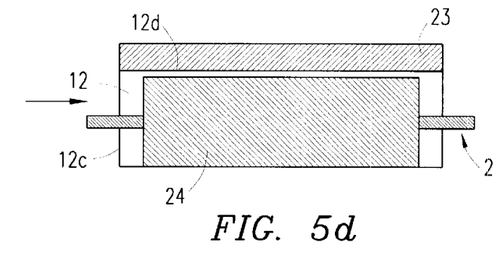
FIGS. 5d, e, f represent an embodiment of fastening a piece of film with a free portion of contour according to the invention.
Figure 5E:
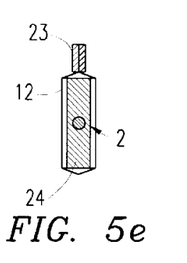
Figure 5F:
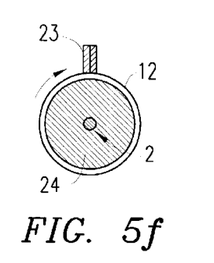

In FIG. 5d, the film 12, rectangular in a contour of its surface, is rolled along one side of the contour 12c and is secured on a rigid carcass 23 along the other side of the contour 12d, so that the resultant three-dimensional shape of the film surface is determined by the form and position of a second electrically conductive member 24 of the electrostatic location means which is inserted into an inner cavity formed by the film 12. FIG. 5e and FIG. 5f illustrate examples of a cross-section for different embodiments of mating the electrically conductive members of the electrostatic location means with a partially-free film on one of such members.

During mutual movement of the electrically conductive members 3 and 4, they can take different mutual positions, and it is often necessary to return the electrically conductive members to an initial position.

To perform this function, the designs of the electrostatic location unit further includes a means for returning conformal surfaces of the electrically conductive members to the initial position.

Figure 6A:
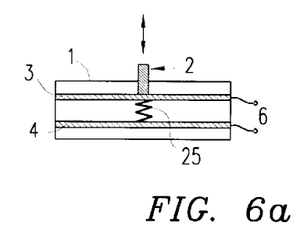
FIGS. 6a, b illustrate embodiments of the arrangement of a means for returning members of the electrostatic location means according to the invention.
Figure 6B:
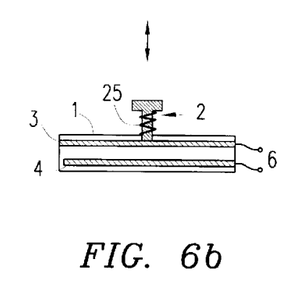

Such a means may be installed, for instance, as a spring 25 between the electrically conductive members 3 and 4 (FIG. 6a) or between the unit housing 1 and the locating member 2 (FIG. 6b).

Figure 7:
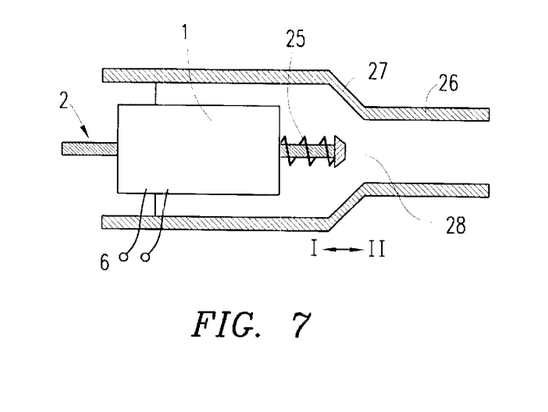
FIG. 7 illustrate an electromechanical valve comprising an electrostatic location unit according to the invention.

A peculiar area for application of the electrostatic location unit opens in connection with the development of valve mechanism designs. FIG. 7 illustrates a diagram of a gas valve designed to close a hole made as a seat 27 of a valve of a pipe 26. The valve comprises a gate 28 arranged to take two positions: in one position, the hole of the seat 27 is closed; in the other position, the hole of the seat is open. The gate can be located in one of these positions owing to link with the locating member 2 of the electrostatic location unit whose housing 1 is secured in the pipe.

As already noted, a large variety of designs of electrostatic location units makes it impossible to develop power interlocks. Therefore, in order to use advantages of electrostatic units in power mechanisms, said units should be further provided with engaging members, a means for power engagement of said members, said means being linked to the locating member, as well as a means for returning the power engagement means from the locked position to the unlocked position, or vice versa.

Figure 8A:
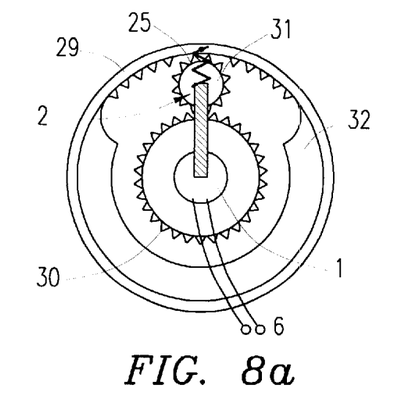
FIGS. 8a, b illustrate the position of members of an electrostatic planetary gear clutch according to the invention.
Figure 8B:
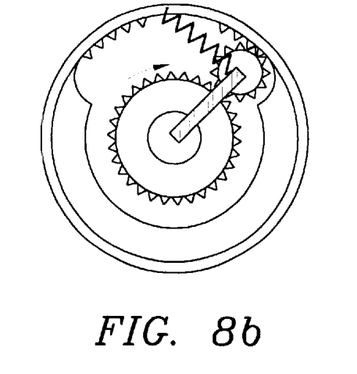

FIGS. 8a and 8b illustrate respectively the unlocked and the locked position of a planetary gear clutch comprising a ring gear 29, a sun wheel 30 and a satellite gear 31. A slot is provided in some portion of a toothed surface of the sun wheel where teeth are absent, so that the satellite gear does not interact with the ring gear within said portion. A satellite gear travel limiter 32 is also provided on the ring gear, said limiter determining extreme positions in going out of said slot. The housing 1 of the electrostatic location unit is secured on the sun wheel, and the locating member 2 linked thereto performs the function of a satellite gear carrier.

The means for returning the satellite gear to the initial position is made as a spring 25 secured on the ring gear and linked to the satellite gear carrier.

Figure 9A:
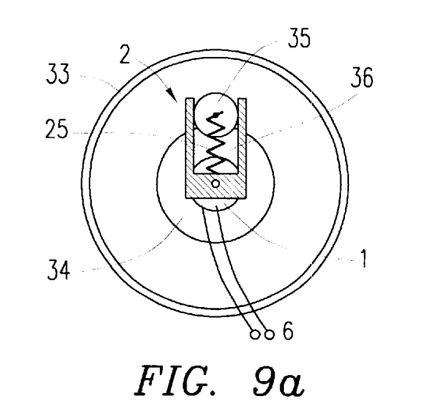
FIGS. 9a, b illustrate the position of members of an electrostatic overrunning clutch according to the invention.
Figure 9B:
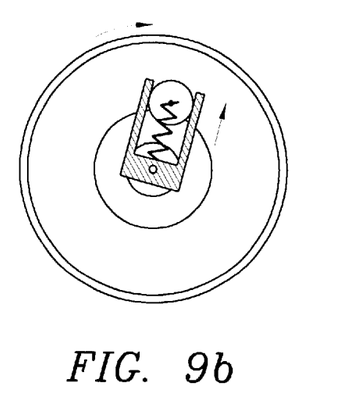

FIG. 9a and FIG. 9b show a position of an electrostatic overrunning clutch wherein a bushing 33 is secured on one shaft, a cam 34 is secured on another shaft and has a slot arranged on its perimeter, a friction disc 35 is arranged in a space between the cam and the bushing, an electrostatic location unit 2 designed for location of the angular position of the friction disc relative to the angular position of the bushing, is secured on a shaft of the bushing and comprises a locating member made as a flat fork 36 rotating on an axle coincident with the axle of the shafts and comprising a slit that is a guide for the friction disc when it reciprocates radially from the cam to the bushing. The means for returning the friction disc to the initial position, into the cam slot, is made as a spring 25 linked to the friction disc axle and the cam axle.

Figure 10:
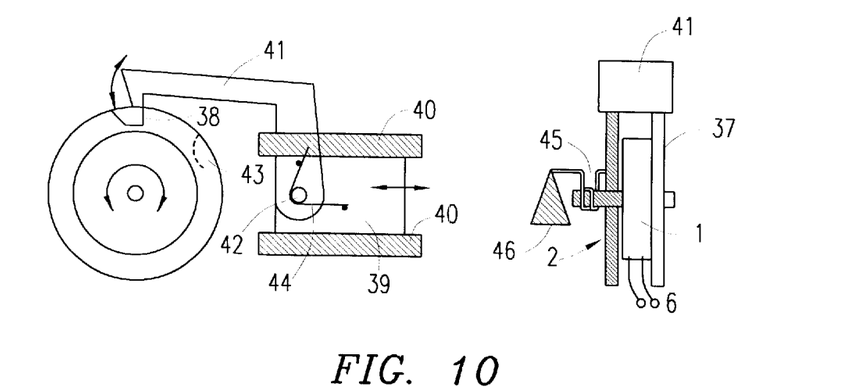
FIG. 10 illustrates the position of members of a reciprocating transmission mechanism according to the invention.

FIG. 10 illustrates another power transmission mechanism wherein a driving member 37 is made as a disc rotating about an axle secured in the transmission mechanism and comprising a slot 38 arranged on the disc perimeter. A driven member 39 is made as a bar reciprocating in a cradle 40 secured in the housing of said mechanism. The means for power engagement of the driving and driving members is made as a dog 41 rotatably secured on an axle 42 fastened on the driven member. The housing 1 of the electrostatic location unit is arranged on the disc of the driving member, while the locating member 2 is made as a disc whose axle is coincident with the axle of the driving member rotating about this axle and comprises a slot 43 arranged on the disc perimeter. At the same time, the means for mechanical setting the dog to a position of engaging the slots on the discs 2 and 37 is made as a spring 44 linked to the bar and the dog, while the means for returning the disc of the locating member 2 to the initial position is made as a spring 45 linked to the disc of the locating member 2 and a housing piece 46 of the transmission mechanism.

As already noted, the designs of electrically conductive members with elastic films illustrated in FIG. 5 allow to realize multiple embodiments of their mutual movements and locating member movements associated therewith. With this, both various ways of fastening the film on the carcass and fastening the carcass itself on the electrically conductive members permit to develop designs in which the locating member reciprocates in different directions, makes rotary motions and performs more complicated movements which are a combination of the former two.

As an example, FIGS. 5a, b, c, d, e, f shows arrows that indicate permissible directions of the movement of the locating member in different designs of the electrostatic location unit.

At the same time, different positions of the locating member can be located at a moment when the electrically conductive members are in close proximity, and the electrical charge is applied thereto.

As soon as the electrical charge is relieved from the electrically conductive members, forces exerted to the locating member will return it to the initial position.

Particularly, when an external force applied to the electrically conductive members 3 and 4 of the electrostatic unit illustrated in FIG. 6 closely approaches them to one another, and then an electrical charge is applied to said members in opposite polarity, an electrostatic voltage will occur therebetween that counteract against the force of the returning spring 25. When the charge is relieved, the attraction of the electrically conductive members disappears, and the locating member returns to the initial position.

This operation of the electrostatic location unit has been used for actuating the valve illustrated in FIG. 7. The initial position is a position when a gate closes the valve seat, that is, the valve is closed, and the second position, defined by applying the electrical charge to the electrostatic location unit, is a position when the gate is moved apart from the valve seat, that is, the valve is open.

Embodiments of electromechanical devices for power engagement, that use the electrostatic location unit and are represented in FIGS. 8 to 10, operate as follows.

The initial position of members of the planetary gear clutch illustrated in FIG. 8a is characterized in that the electrostatic location unit is not charged, and the satellite gear carrier can freely rotate about its axis which is coincident with the axis of the sun wheel. At the same time, owing to action of the spring 25, the satellite gear is in a position relative to the ring gear, in which position the satellite gear is in tooth engagement, that is, the satellite gear is in the slot. In this initial position, the rotation of the sun wheel is accompanied by free rotation of the satellite gear about its own axis and does not result in power engagement of the driving and driven shafts.

When an electrical charge is applied to the electrostatic location unit, the locating member and the satellite gear carrier are located relative to the angular position of the sun wheel. When the sun wheel rotates clockwise, the carrier also begins to move in this direction. Being kinematically linked to the satellite gear, the carrier goes from the initial position and, having turned by a certain angle, thrusts against a ring gear stop 32 (FIG. 8b).

Owing to the fact that the ring gear has teeth in said portion, power engagement of satellite gear teeth with ring gear teeth takes place and results in power engagement of the sun wheel and the ring gear; as a consequence, a power link occurs between the driving and driven shafts.

Such power engagement will be maintained as long as a force is kept that rotates the driving shaft. With this, the rotation of the mechanical location unit does not need any charge supply, that is, no additional electrical energy consumption is necessary.

When the electrostatic location unit discharges and the rotating force is removed from the driving shaft, the satellite gear carrier gets released, and the satellite gear returns to the initial position by the spring 25. Power engagement of the driving and driven shafts disappears.

The overrunning clutch illustrated in FIG. 9 operates in similar manner.

In the initial position, the friction disc is held by the spring 25 in the slot of the cam 34 and has no contact with the inner surface of the bushing 33.

Therefore, the driven and driving shafts are disengaged.

When an electric charge is applied to the electrostatic location means, a fork that serves as the locating member 2 is located relative to the angular position of the bushing 33 and, when the bushing 33 rotates clockwise, the fork moves in the same direction thereby pulling the friction disc 35 therewith. In doing so, the friction disc rolls out of the cam slot and thrusts against the surface of the bushing 33 (FIG. 9b). With a proper selection of diameters for the cam 34, the bushing 33 and the friction disc 35, power friction interaction begins between these members when the angles of interaction of said members are less than the friction angle, and thereby the transfer of motion from the driving shaft to the driven one takes place.

When the electrostatic location unit is discharged, the fork gets released so that the following removal of the rotating force from the driving shaft results in weakening of power engagement of the members 33, 34 and 35, and the friction disc 35 returns to the initial position in the cam slot by the returning spring.

The driving and driven shafts are disengaged.

The transmission mechanism (FIG. 10) operates as follows.

In the initial position, the angular positions of the slots 38 and 43 arranged on the are not coincide. In this position, the dog 41 cannot let down into the slot 38, therefore, when the driving disc 37 rotates, its rotation is not transmitted to the driven member 40.

For power engagement of the dog 41 with the driving disc 37, it is necessary to turn the disc 37 clockwise till the slots 38 and 43 are aligned, and then apply an electrical charge to the electrostatic location unit, thereby providing mutual location of the discs.

If the driving disc 37 is further rotated counterclockwise, it will pull the second disc therewith. At a moment when both slots are under a tooth of the dog, the latter will let down in under the action of the spring 44 and will move into power engagement with the driving disc 37.

During further rotation of the driving disc 37 counterclockwise, the dog 41 pulled therewith will transmit motion to the bar 39. Should the electric charge is relieved from the electrostatic location means, the spring 45 will move the slots 43 and 38 on the discs from alignment, and the dog will be pulled out of the position of engagement therewith.

Power engagement of the driving disc 37 and the driven bar 39 will be terminated.

The above embodiments of the devices are only illustrative and in any case not limit the scope of the invention defined by the claims.

Industrial Applicability

It should be noted in conclusion that the disclosed invention opens up excellent opportunities for development of automatic electronic systems qualitatively different from those based on the use of electromagnetic location units or devices for moving members of interlocks.

Owing to the considerably lower electrical energy consumption, electrostatic mechanical interlocks allow to develop a new generation of entirely off-line electronic systems using their own or external mechanical energy with its partial conversion into electrical energy to energize their electronic control devices.

The most use of such systems is found in development of robotics devices, electromechanical control units for systems where mechanical energy sources are either limited or absent at all, particularly for systems energized from solar batteries.

I claim:

1. An electrostatic unit for location of members of a mechanical device, comprising:
    a housing of the electrostatic location unit,
    a locating member arranged in the housing and movable from one position to another,
    an electrostatic location means designed for location of the locating member in one of the positions. placed in the housing and comprising two electrically conductive members and a layer of a dielectric therebetween, conformal surfaces of the electrically conductive members and the dielectric being designed for electrostatic interaction and location of one relative to the other when they are in close proximity to each other and when an electric charge is applied to the electrically conductive members, one of said members of the electrostatic location means being kinematically linked to the locating member,
    a means for applying an electric charge to the electrically conductive members, said means being connected to the electrically conductive members,
    at least one of the members of the electrostatic location means comprises a layer of an elastic material on a conformal surface, said elastic material being selected from the group consisting of an electrically conductive material and a dielectric material.

2. An electrostatic unit according to claim 1, wherein the layer of the elastic material on the conformal surface comprises at least two sublayers of a material, one of the sublayers of the material being electrically conductive and the other being dielectric.

3. An electrostatic unit according to claim 2, wherein the sublayer of the electrically conductive material is deposited by a process selected from the group consisting of depositing a sublayer of a metal onto the sublayer of the dielectric material, introducing particles of the electrically conductive material into a surface region of the dielectric sublayer, or by such changes in a chemical or stoichiometric composition of the surfaces of the dielectric sublayer which make the dielectric sublayer electrically conductive.

4. An electrostatic unit according to claim 1, wherein at least one layer of the elastic material comprises an elastic film fastened on a carcass and connected to the respective electrically conductive member of the electrostatic location means.

5. An electrostatic unit according to claim 4, wherein the elastic film is fastened on a member of the electrostatic location means and/or on the carcass by a means selected from the group consisting of a gluing joint, a welding joint or a clamping joint.

6. An electrostatic unit according to claim 4, wherein the elastic film comprises sublayers made of materials selected from the group consisting of an electrically conductive material and a dielectric material.

7. An electrostatic unit according to claim 4, wherein one part of a contour of the elastic film is fastened on the carcass, and another part of the elastic film is not fastened on the carcass and is free in the process of interaction of the conformal surfaces of the electrically conductive members.

8. An electrostatic unit according to claim 4, wherein the carcass comprises at least two non-linked members.

9. An electrostatic unit according to claim 8, wherein the carcass comprises two non-linked rings, a diameter of one of the rings being less than that of the other, wherein the rings are arranged in one plane and one ring inside the other ring, and the elastic film fastened on the carcass has the form of a flat ring.

10. An electrostatic unit according to claim 8, wherein the carcass comprises two rings having equal diameters, wherein the rings are arranged in different parallel planes, the centers of the rings are on one axis, and the elastic film fastened on the carcass has the form of a cylinder.

11. An electrostatic unit according to claim 8, wherein the carcass comprises a ring and a disc having different diameters and arranged in different parallel planes, the centers of the ring and the disc are on one axis, and the elastic film fastened on the carcass has the form of a cone.

12. An electrostatic unit according to claim 1, wherein the layer of the elastic material of the electrostatic location means member is made of an electrically conductive material selected from the group consisting of polymeric materials.

13. An electrostatic unit according to claim 1, wherein used as the materials of the layers and sublayers of the conformal surfaces are materials selected from the group consisting of materials based on polyethylene terephtalates, polytetrafluoroethylenes, polytrifluorochloroethylenes, poly-imides and silicon rubber.

14. An electrostatic unit according to claim 1, wherein used as the materials for the layers of the conformal surfaces are semiconductor materials.

15. An electrostatic unit according to claim 1, wherein the conformal surfaces of the electrically conductive members are arranged in close proximity to one another, and mutual movement of the electrically conductive members is performed along said conformal surfaces, while location of mutual position of said members is performed when the electrical charge is applied to the electrically conductive members.

16. An electrostatic unit according to claim 1, wherein the conformal surfaces of the electrically conductive members have two. positions, that is, a position in close proximity to one another, and the other position at a certain distance from one another, and mutual movement of the electrically conductive members from one said position to the other is performed under mechanical action to the locating member, wherein electrostatic location of mutual position of the electrically conductive members is accomplished when the members are positioned in close proximity to one another.

17. An electrostatic unit according to claim 1, wherein said unit further comprises a means for returning the conformal surfaces of the members of the electrostatic location unit to one of selected positions, said means being arranged in the unit housing and directly linked to said members.

18. An electrostatic unit according to claim 1, wherein said unit further comprises a means for returning the locating member to one of selected positions, said means being linked to the locating member and the housing of the electrostatic location unit.

19. An electrostatic unit according to claim 17 or 18, wherein said unit is made as an electromechanical valve of a gas/hydraulic distribution system and further comprises
    a pipe with a seat of the valve, a gate of the valve arranged to take two positions in one of which a hole of the valve seat is closed and in the other the hole of the valve seat is open, the housing of the electrostatic location unit being fastened on the pipe, and the locating member being kinematically linked to the gate.

20. An electromechanical device for power engagement of members of a mechanical unit, comprising:
    an electrostatic location unit comprising:
        a housing and a locating member linked to the housing and arranged so that it can move from one position to the other, a means for applying an electrical charge to the electrostatic location unit, at least two engaging members linked to the members of the mechanical unit and designed for power engagement relative to one another, a means for power engagement of the engaging members, said power engagement means being kinematically linked to at least one of the engaging members and having a locked position and an unlocked position, a means for returning the power engagement means to an initial position, said returning means being linked to one of the engaging members, wherein the power engagement means is kinematically linked to the locating member of the electrostatic location unit, said means for returning the power engagement means to an initial position, said returning means being linked to at least one of a plurality of members selected from the group consisting of the power engagement means and the locating member.

21. An electromechanical device according to claim 20, wherein the electrostatic location unit comprises an electrostatic location means designed for location of the locating member in one of the positions, placed in the housing of the electrostatic location unit and comprising two electrically conductive members and a layer of a dielectric therebetween, conformal surfaces of the electrically conductive members and the dielectric being designed for electrostatic interaction and location of one relative to the other when they are in close proximity to each other and when an electrical potential is applied to the electrically conductive members, one of said members of the electrostatic location means being kinematically linked to the locating member, wherein at least one of the members of the electrostatic location means comprises a layer of an elastic material on a conformal surface, said elastic material being selected from the group consisting of an electrically conductive material and a dielectric material.

22. An electromechanical device according to claim 20, wherein the electrostatic location unit comprises an electrostatic location means designed for location of the locating member in one of the positions, placed in the housing of the electrostatic location unit and comprising two electrically conductive members and a layer of an electro-rheologic liquid therebetween, conformal surfaces of the electrically conductive members being designed for electrostatic interaction and location of one relative to the other when they are in close proximity to each other and when an electrical potential is applied to the electrically conductive members, one of said members of the electrostatic location means being kinematically linked to the locating member.

23. An electromechanical device according to claim 20, wherein said device is made as a planetary gear clutch designed to transfer rotary motion from one shaft of the planetary gear clutch to another shaft, axes of the shafts being coincident, and comprises a ring gear secured on one of the shafts and having a slot and limiters made on a toothed surface of said gear, a sun wheel secured on the other shaft and arranged inside the ring gear, a means for power engagement of the sun wheel and the ring gear, said means being made as a satellite gear having positions such that in a first position, the satellite gear is in the slot of the ring gear, and the ring gear and the sun wheel are out of power engagement, and in a second position, the satellite gear thrusts against the limiter, and the ring gear and the sun wheel are in power engagement, wherein the housing of the electrostatic location unit is secured on the same shaft as the sun wheel, the locating member is made as a satellite gear carrier and performs location of the angular position of the satellite gear relative to the angular position of the sun wheel when an electrical charge is applied to the electrostatic location unit, linked the means for returning the satellite gear to the slot of the ring gear is made as a spring linked to the carrier and the ring gear of the clutch.

24. An electromechanical device according to claim 20, wherein said device is made as an overrunning clutch designed to transfer rotary motion from one shaft to another shaft, axes of the shafts being coincident, and comprises a bushing secured on one of the shafts, a cam secured on the other of the shafts, arranged inside the bushing and made as a disc having a slot on the perimeter, a means for power engagement of the cam and the bushing, said means being made as a friction disc arranged in a space between the cam and the bushing, an axis of said means being parallel to the axis of the shafts, wherein a diameter of the friction disc slightly exceeding the difference of an inner diameter of the bushing and an outer diameter of the cam so that the friction disc does not come into contact with the bushing when fitting into the cam slot and, when going out from the cam slot, causes power friction jamming of relative motion of the cam and the bushing, an electrostatic location unit designed for location of the angular position of the friction disc relative to the angular position of the bushing, said unit being secured on a bushing shaft and comprising:

a locating member made as a flat fork rotating on an axle coincident with the axis of the shafts and having a slit that is a guide for the friction disc when it reciprocates radially from the cam to the bushing, a means for returning the friction disc to an initial position, into the cam slot, is made as a spring linked to the friction disc and the cam axle.

25. An electromechanical device according to claim 20, wherein said device further comprises a means for mechanical setting the power engagement means to a selected position associated with one of the engaging members.

26. An electromechanical device according to claim 25, wherein said device is designed to interlock the transfer of motion from a driving member to a driven member of a transmission mechanism, wherein the driving member is made as a disc rotating about an axle secured in the transmission mechanism and comprises a slot arranged on the disc perimeter, the driven member is made as a bar reciprocating in a cradle secured in the housing of said mechanism, the means for power engagement of the driving and driven members is made as a dog fastened rotatably on an axle which is fastened on the driven member, the housing of the electrostatic location unit is arranged on the disc of the driving member, the locating member is made as a disc whose axle is coincident with an axle of the driving member rotating about said axis, the locating member disc comprising a slot arranged on the disc perimeter, the means for mechanical positioning the dog to the position of engaging the slots on the discs is made as a spring linked to the bar and the dog, the means for returning the dog to the initial position is made as a spring linked to the disc of the locating member and the housing piece of the mechanism.

* * * * *